(12) United States Patent  (10) Patent No.: US 12,338,742 B1
Cox  (45) Date of Patent: Jun. 24, 2025

(54) SOLAR ENERGY TO ELECTRICAL ENERGY OR SOLAR THERMAL POWER PLANT FOR THE GENERATION OF ELECTRICITY

(71) Applicant: J. Jack Cox, Natchez, MS (US)

(72) Inventor: J. Jack Cox, Natchez, MS (US)

( * ) Notice: Subject to any disclaimer, the term of this patent is extended or adjusted under 35 U.S.C. 154(b) by 0 days.

(21) Appl. No.: 18/889,178

(22) Filed: Sep. 18, 2024

(51) Int. Cl.
| | | |
|---|---|---|
| F01D 15/10 | (2006.01) |
| F01K 11/02 | (2006.01) |
| F22B 1/00 | (2006.01) |
| F24S 20/20 | (2018.01) |
| F24S 23/74 | (2018.01) |
| F24S 30/425 | (2018.01) |
| H02K 7/18 | (2006.01) |

(52) U.S. Cl.
CPC .............. *F01D 15/10* (2013.01); *F01K 11/02* (2013.01); *F22B 1/006* (2013.01); *F24S 20/20* (2018.05); *F24S 23/74* (2018.05); *F24S 30/425* (2018.05); *H02K 7/1823* (2013.01); *F05D 2220/76* (2013.01)

(58) Field of Classification Search
CPC ......... F01D 15/10; F24S 30/425; F24S 23/74; F24S 20/20; F01K 11/02; F22B 1/006; H02K 7/1823; F05D 2220/76
See application file for complete search history.

(56) References Cited

U.S. PATENT DOCUMENTS

| | | | |
|---|---|---|---|
| 1,683,266 A | | 9/1928 | Shipman et al. |
| 4,055,948 A | * | 11/1977 | Kraus .................... F24S 20/20 324/624 |
| 4,171,695 A | | 10/1979 | Sletten |
| 4,213,303 A | | 7/1980 | Lane |
| 4,249,516 A | | 2/1981 | Stark |
| 4,257,401 A | | 3/1981 | Daniels |
| 4,286,581 A | | 9/1981 | Atkinson, Jr. |
| 4,455,826 A | * | 6/1984 | Knoos .................... F02G 1/0445 60/641.15 |
| 5,404,869 A | | 4/1995 | Parkyn, Jr. et al. |
| 5,417,052 A | | 5/1995 | Bharathan et al. |
| 7,296,410 B2 | | 11/2007 | Litwin |
| 2008/0216822 A1 | | 9/2008 | Lazzara et al. |
| 2009/0199557 A1 | * | 8/2009 | Bennett .................. F03G 6/071 60/641.15 |
| 2012/0138447 A1 | * | 6/2012 | Glynn ....................... C02F 1/14 202/189 |
| 2017/0010022 A1 | * | 1/2017 | Newman ................. F24S 60/30 |

* cited by examiner

*Primary Examiner* — Shafiq Mian
(74) *Attorney, Agent, or Firm* — Fresh IP PLC; Terrence L. B. Brown

(57) ABSTRACT

A solar thermal power plant for the generation of electricity includes the power plant has a series of parabolic reflectors and a series of lenses to focus the sun's energy on a metal cylinder that transfers heat generated to water carried in the power plant, converting the water to steam. The metal cylinder has a top and a bottom. The steam powers a steam turbine generator provided in the plant, and which steam turbine generator in turn is connected to an electrical generator. The parabolic reflector and lenses being independently movable and controlled by a computer to track the sun. The cylinder surrounds a tubing which may carry water, the tubing being a coil which extends throughout the length of the cylinder, and which has a spiraling diameter. The metal cylinder encases the spiral tubing; and the liquid to which heat is transferred in the tubing being water in use.

11 Claims, 1 Drawing Sheet

SOLAR ENERGY TO ELECTRICAL ENERGY OR SOLAR THERMAL POWER PLANT FOR THE GENERATION OF ELECTRICITY

FIELD OF THE INVENTION

A method of converting sun energy to electrical energy to provide electricity to power homes and industry.

BACKGROUND OF THE INVENTION

This invention will create electricity without creating a carbon footprint.

There are many operational solar plants in existence today. Some of these plants are located in the Mojave Desert. Use of parabolic mirrors and lenses heat up synthetic oil which is used to transfer heat to water causing steam which powers a turbine generator.

There have been major fires caused by overheating the synthetic oil. The solar thermal power plant for the generation of electricity requires less physical space, can run days without sunshine and does not create a fire hazard.

There are numerous solar panel projects all over the world with many in the development and planning phase. The panels convert sunlight to electricity which is usually stored in a battery farm to supplement the electrical grid. These solar panel projects require hundreds of acres of land which could be better used for agricultural purposes. The solar thermal power plant for the generation of electricity or system will require less acreage i.e., 5 to 6 acres. Most of the solar panels and related equipment are made in China. Other plants use parabolic mirrors and lenses to heat up fluidized salt which is used to transfer heat to water causing steam which turns a turbine generator. The solar thermal power plant for the generation of electricity according to the invention will use articulated mirrors and lenses to follow the sun throughout the daylight hours having greater efficiency and minimal environmental risks.

Wind Turbines are being placed in the oceans and on the plains.

They create an environmental hazard with wildlife (fish, whales, and birds).

They work only when the wind is blowing. The solar thermal power plant for the generation of electricity according to the invention does not depend on the wind.

OBJECTS AND SUMMARY OF THE INVENTION

As climatologists and data have indicated, the world is getting much hotter. This fact can be used to create green electricity. The principle is one of using articulated parabolic mirrors and lenses to heat up a solid metal cylinder. This metal cylinder has coiled tubing encapsulated. The metal cylinder is completely enclosed with a solid metal fence with cog tracks on top on which the mirrors and lenses move and follow the sun to maximize heat transfer. Once the metal cylinder is heated to a predetermined temperature water will be pumped through the coiled tubing with high pressure steam being created. The steam is piped to a turbine generator. The size and shape of all components will depend on the amount of energy desired plus the latitude and longitude of where the system will be located. Minimum personnel will be required since all phases will be computer controlled. This system will work well for remote villages such as ones in middle Africa.

DESCRIPTION OF THE INVENTION

Figure 1:
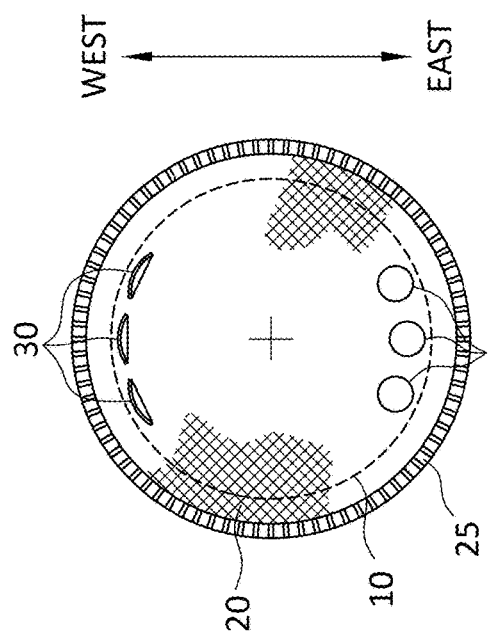
FIG. 1 shows a top plan view of a solar thermal power plant for the generation of electricity according to the invention.
Figure 2:
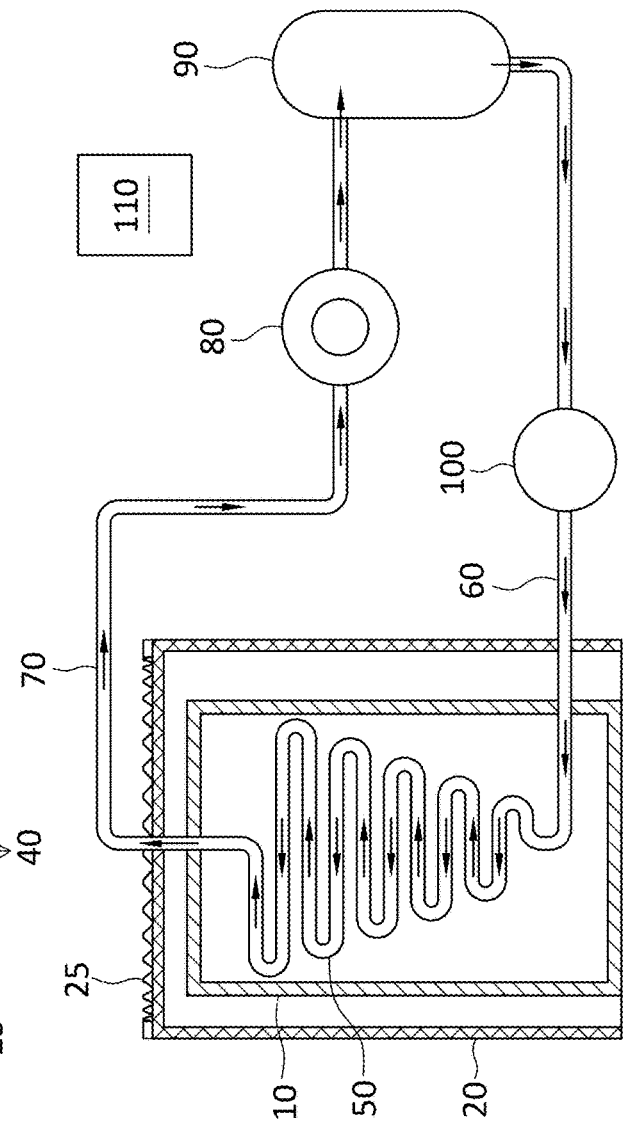
FIG. 2 shows a side view of a solar thermal power plant for the generation of electricity according to the invention.
Figure 3:
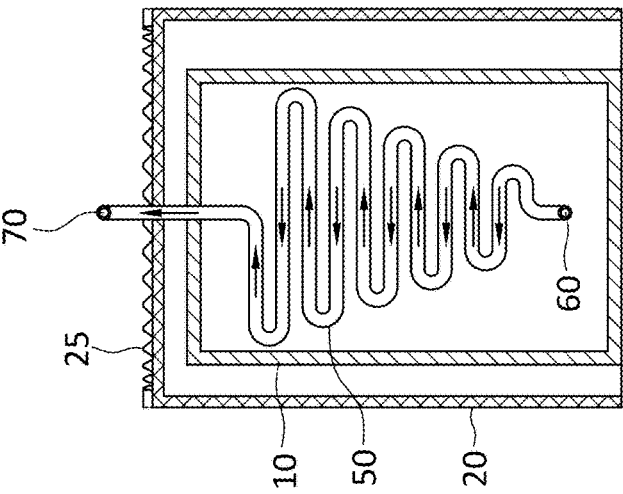
FIG. 3 shows a further side view of a solar thermal power plant for the generation of electricity according to the invention.

As shown in FIGS. 1-3 the sun comes up from the East, the parabolic mirrors 30 start reflecting infrared light creating heat with the lenses 40 focusing light by refraction creating more heat. Both mirrors 30 and lenses 40 focus their heat energy on a large solid metal cylinder 10. The metal cylinder 10 has coiled tubing 50 embedded inside. There is a water inlet 60 for tubing 50, and which water inlet 60 may be at the bottom of the solid metal cylinder 10 for returning water to be heated into tubing 50. The metal cylinder may be enclosed completely 360 degrees by a solid steel fence or wall 20 which is some 10 feet higher than the metal cylinder 10. The solid steel wall 20 has a cog track 25 on top on which the articulated mirrors 30 and lenses 40 move during the daylight hours following the sun. The movement of the mirrors 30 and lenses 40 is controlled by a computer bank 110. Once the metal cylinder 10 reaches a predetermined temperature the process begins by the level control pump 100 starting to inject water into the embedding coiled tubing 50. The startup phase will require an outside source of electricity. The water is pumped into the bottom of the metal cylinder 6 and works its way through the coiled tubing 50 turning to steam which exits the metal cylinder 70. The high pressure steam is piped to a turbine generator 80. As the steam exits the turbine it is piped to a condensation tank 90 to finish the condensing of the steam to water to be used over again through the system; i.e., reused in tubing 50.

In other words, a solar thermal power plant for the generation of electricity, including the power plant has a series of parabolic mirrors or reflectors 30 and a series of lenses 40 to focus the sun's energy on a metal cylinder 10 that transfers heat generated to water carried in the power plant in a steam outlet 70, converting the water to steam. The metal cylinder 10 has a top and a bottom. The steam powers a steam turbine generator 80 provided in the plant, and which steam turbine generator 80 in turn is connected to an electrical generator. The parabolic reflectors 30 and lenses 40 being independently movable and controlled by a computer or computer bank 110 to track the sun;

The cylinder 10 surrounds a coiled tubing 50 which may carry water, the coiled tubing 50 being a coil which extends throughout the length of the cylinder 10, and which has a spiraling diameter. The metal cylinder encasing the spiral tubing; and the liquid to which heat is transferred in the tubing 50 being water in use.

The power plant further may include the spiraling diameter of the tubing 50 decreases in diameter as it extends downwardly from the top of the cylinder to the bottom of the cylinder, as shown in FIGS. 2 and 3.

The power plant may include that the liquid to which heat is transferred in tubing 50 is free of a saline brine solution.

The power plant may include that the spiral tubing 50 includes a cross section which is a cylindrical.

The power plant may include that the spiral tubing 50 is a metal spiral tubing.

The power plant may include a condensation tank 90 is provided for condensing steam after the steam has powered the steam turbine generator 80.

The power plant may include a level control pump 100 is provided for controlling the level of the water after the water has been condensed by the condensation tank 90.

The power plant may include that the metal cylinder 10 is substantially solid.

The power plant may include the substantially solid metal cylinder 10 includes aluminum, and the coil 50 includes stainless steel tubing.

The power plant may include that the substantially solid metal cylinder 10 is aluminum and the coil includes stainless steel tubing 50.

The stainless steel tubing 50 has a melting point of approximately 2500 degrees F. and the aluminum of the substantially solid metal cylinder 10 has a melting temperature of approximately 1250 degrees F.; and the stainless steel coil tubing 50 can be put in place and melted aluminum poured in without damaging the stainless steel coil 50.

The power plant may include that the substantially solid metal cylinder that includes aluminum and the coil includes stainless steel tubing, and the stainless steel coil tubing resists corrosion.

It will be readily understood by a person having ordinary skill in the art that the above system may be constructed in a variety of ways in accordance with the invention.

For example, given that the specific heat of Aluminum is about twice the specific heat of iron, In other words aluminum will get hotter sooner than iron and will have more BTUs of energy stored up at any given temperature. The solid metal cylinder may be made of aluminum and the coil made out of stainless steel. Stainless steel has a melting point of approximately 2500 degrees F. and aluminum has a melting temperature of approximately 1250 degrees F. That being said the stainless steel coil tubing can be put in place and melted aluminum poured in without damaging the stainless steel coil. Stainless steel may be or should be used because of its resistance to corrosion and its increased strength. The water used for steam will have scaling inhibitors added.

The metal cylinder provides that there is a greater mass serving as a heat sink to ensure that the heating of the liquid in the tubing continues after the sun is blocked by clouds or by nightfall.

Further, the cylinder may be 200 ft. in diameter with 25 ft. thick walls with embedded pipes through which water circulates and is turned to steam thanks to walls being heated by the sunlight to greater than boiling water.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention.

The invention claimed is:

1. A solar thermal power plant for the generation of electricity, comprising:
   the power plant including a series of parabolic reflectors and a series of lenses to focus the sun's energy on a metal cylinder that transfers heat generated to water carried in the power plant, converting the water to steam;
   the metal cylinder having a top and a bottom;
   the steam powers a steam turbine generator provided in the plant, and the steam turbine generator is connected to an electrical generator;
   the parabolic reflector and lenses being independently movable and controlled by a computer to track the sun;
   the cylinder surrounds a tubing which may carry water, the tubing being a coil which extends throughout the length of the cylinder, and which has a spiraling diameter;
   the metal cylinder encasing the spiral tubing; and
   the liquid to which heat is transferred in the tubing being the water in the power plant.

2. The power plant according to claim 1, wherein:
   the spiraling diameter of the tubing decreases in diameter as it extends downwardly from the top of the cylinder to the bottom of the cylinder.

3. The power plant according to claim 1, wherein:
   the liquid to which heat is transferred is free of a saline brine solution.

4. The power plant according to claim 1, wherein:
   the spiral tubing includes a cross section which is cylindrical.

5. The power plant according to claim 1, wherein:
   the spiral tubing includes a metal spiral tubing.

6. The power plant according to claim 1, wherein:
   a condensation tank is provided for condensing steam after the steam has powered the steam turbine generator.

7. The power plant according to claim 1, wherein:
   a level control pump is provided for controlling the level of the water after the water has been condensed by the condensation tank.

8. The power plant according to claim 1, wherein:
   the metal cylinder is substantially solid.

9. The power plant according to claim 8, wherein:
   the substantially solid metal cylinder includes aluminum and the coil includes stainless steel tubing.

10. The power plant according to claim 9, wherein:
    the substantially solid metal cylinder includes aluminum, and the coil includes stainless steel tubing;
    the stainless steel tubing has a melting point of approximately 2500 degrees F. and the aluminum of the substantially solid metal cylinder has a melting temperature of approximately 1250 degrees F.; and
    the stainless steel coil tubing can be put in place and melted aluminum poured in without damaging the stainless steel coil.

11. The power plant according to claim 8, wherein:
    the substantially solid metal cylinder includes aluminum, and the coil includes stainless steel tubing; and
    the stainless steel coil tubing resists corrosion.

* * * * *